United States Patent
Kim

(10) Patent No.: US 8,339,224 B2
(45) Date of Patent: Dec. 25, 2012

(54) VIBRATION DEVICE

(75) Inventor: Sang Jin Kim, Gyeongsangnam-do (KR)

(73) Assignee: LG Innotek Co., Ltd., Seoul (KR)

( * ) Notice: Subject to any disclaimer, the term of this patent is extended or adjusted under 35 U.S.C. 154(b) by 262 days.

(21) Appl. No.: 12/407,708

(22) Filed: Mar. 19, 2009

(65) Prior Publication Data

US 2009/0174510 A1 Jul. 9, 2009

Related U.S. Application Data

(63) Continuation of application No. 10/527,755, filed on Mar. 14, 2005, now Pat. No. 7,525,403.

(30) Foreign Application Priority Data

Jul. 5, 2003 (KR) .................. 45539/2003

(51) Int. Cl.
*H01F 7/08* (2006.01)

(52) U.S. Cl. .................. 335/222; 381/401; 335/223

(58) Field of Classification Search .................. 335/222, 335/223, 302–306; 340/7.6; 381/401–402; 310/12–20
See application file for complete search history.

(56) References Cited

U.S. PATENT DOCUMENTS

| | | | |
|---|---|---|---|
| 5,107,540 A | 4/1992 | Mooney et al. | |
| 5,682,132 A | 10/1997 | Hiroyoshi et al. | |
| 5,861,686 A * | 1/1999 | Lee | 310/36 |
| 6,211,775 B1 * | 4/2001 | Lee et al. | 340/407.1 |
| 6,377,145 B1 | 4/2002 | Kumagai | |
| 6,754,363 B2 * | 6/2004 | Chang | 381/401 |
| 6,777,895 B2 | 8/2004 | Shimoda et al. | |
| 6,850,138 B1 | 2/2005 | Sakai | |
| 7,005,811 B2 | 2/2006 | Wakuda et al. | |
| 7,038,335 B2 | 5/2006 | Choi et al. | |
| 2002/0122560 A1 | 9/2002 | An | |
| 2003/0062978 A1 | 4/2003 | Shiraki et al. | |
| 2005/0184601 A1 * | 8/2005 | Kweon et al. | 310/36 |
| 2006/0002577 A1 * | 1/2006 | Won et al. | 381/396 |

FOREIGN PATENT DOCUMENTS

| | | |
|---|---|---|
| CN | 1391779 A | 1/2003 |
| GB | 2 162 718 A | 2/1986 |
| JP | 9-117721 A | 5/1997 |
| JP | 2002-1215 A | 1/2002 |
| JP | 2002-263578 A | 9/2002 |
| JP | 2003-033724 A | 2/2003 |
| JP | 2003-080171 A | 3/2003 |
| JP | 2004-105816 A | 4/2004 |
| KR | 2003-15814 A | 2/2003 |
| KR | 370639 B1 | 2/2003 |
| KR | 10-2003-005288 A | 6/2003 |

* cited by examiner

*Primary Examiner* — Bernard Rojas
(74) *Attorney, Agent, or Firm* — Birch, Stewart, Kolasch & Birch, LLP

(57) ABSTRACT

A vibration device according to an embodiment of the present invention includes upper and lower cases combined with each other to form a case, a magnetic force generating unit provided on at least one surface of the upper and lower cases, a vibrating unit including at least one magnet disposed to be opposite to the magnetic force generating unit, and a weight, and at least one elastic unit configured to support the vibrating unit elastically, the elastic unit having a first portion directly contacting the upper case and a second portion contacting the vibrating unit. Further, the first portion is arranged on a first circumference and the second portion is arranged on a second circumference, and wherein a diameter of the first circumference is larger than a diameter of the second circumference.

10 Claims, 6 Drawing Sheets

Fig. 1    BACKGROUND ART
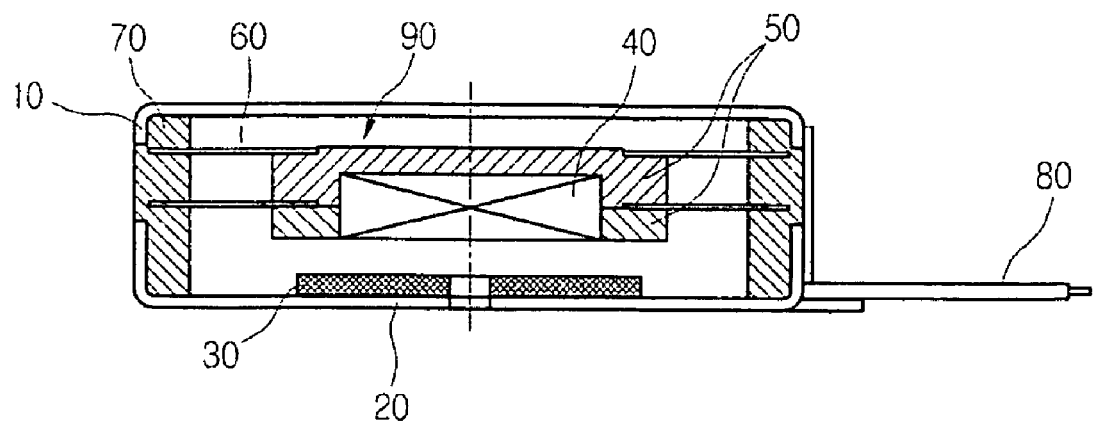
Fig. 2    BACKGROUND ART
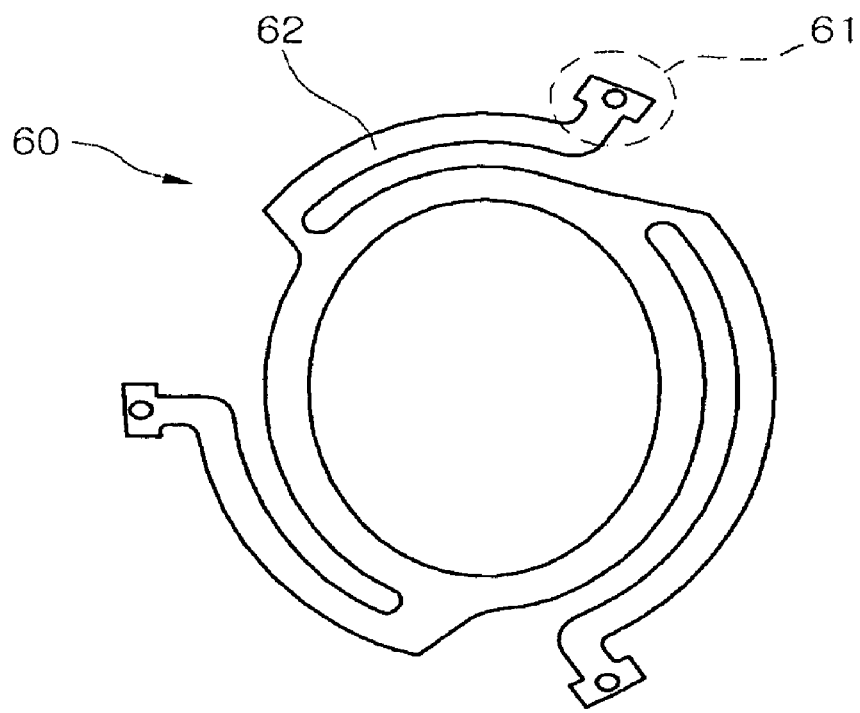

VIBRATION DEVICE

The present application is a 37 C.F.R. §1.53(b) continuation of U.S. patent application Ser. No. 10/527,755 filed Mar. 14, 2005 now U.S. Pat. No. 7,525,403, which claims priority on Koran Patent Application No. 45539/2003, filed Jul. 5, 2003 the entire contents of which are hereby incorporated by reference herein.

TECHNICAL FIELD

The present invention relates to a vibration device, and more particularly, to a vibration device whose vibrating amount is increased by enlarging a size of a weight supported by an elastic unit with the use of the cubic elastic unit, and a vibration device whose vibrating amount is increased by making a larger magnetic force generating unit be supported by the elastic unit.

BACKGROUND ART

Generally, a mobile communication terminal such as a cellular phone, a pager and a PDA employs a vibration device in order to generate vibration in addition to a sound signal such as bell sound to a user when a call or a message is received.

FIG. 1 is a sectional view showing a conventional vibration device, and FIG. 2 is a perspective view showing a leaf spring used in the conventional vibration device.

As shown in FIG. 1, the conventional vibration device includes a lower case 20, a coil 30 mounted at the center of the lower case 20, a circuit board 80 for applying power from outside, a spring holder 70 formed around the outer circumference of the lower case 20, a leaf spring 60 insert-molded to the spring holder 70, a vibrating member 90 elastically supported by the leaf spring 60, and an upper case 10 having a cap shape.

The vibrating member 90 includes a weight 50 with a predetermined weight, and a magnet 40 mounted in a groove formed in a lower surface of the weight 50, and the vibrating member 90 is fixed to the leaf spring 60.

The leaf spring 60 has three fixing legs 62, which are twisted in a pinwheel shape at a ring-shaped loop having a central hollow so that the weight 50 may be combined to an upper portion thereof as if it is inserted therein. An end 61 of the fixing leg 62 is combined with the spring holder 70.

The conventional vibration device configured as above is operated as below. If an external power is applied to the coil 30 through the circuit board 80, a magnetic flux is generated in the coil 30. By means of interaction between the magnetic flux generated in the coil 30 and the magnetic flux of a magnet 40 faced with the coil 30, the vibrating member 90 is vibrated vertically.

The vertical vibration of the vibrating member 90 is transferred to the leaf spring 60, and the vibration transferred by elasticity of the leaf spring 60 is then transferred to the spring holder 70 and the cases 10 and 20, and then to outside.

However, as a mobile communication terminal becomes smaller, the overall size of the vibration device mounted in the mobile communication terminal should be reduced. Accordingly, the weight 50 which directly generates vibration becomes also lighter together with decreasing an outer diameter, so a vibrating amount is also decreased.

Thus, in order to solve this problem, there was an attempt to reduce a size of the magnet 40 and increase a thickness of the weight 50 instead for increasing the vibrating amount.

However, if the weight 50 becomes thicker, the size of the magnet 40 is reduced though a weight of the weight 50 is increased, so the vibrating amount caused by the interaction between the magnet 40 and the coil 30 is even decreased.

In addition, if the weight 50 is enlarged in a circumferential direction in order to increase a vibrating amount, a length of the leaf spring 60 formed between the weight 50 and the spring holder 70 is reduced, thereby decreasing an elastic force. This also decreases a vibrating amount.

Thus, there is an urgent need for a new vibration device which may increase a vibrating amount with a smaller size.

DISCLOSURE OF THE INVENTION

To solve the problems, the present invention provides a vibration device that can increase a vibrating amount by forming elastic units for enhancing vibration on upper and lower surfaces of a weight so as to elastically support the weight.

In another aspect of the invention, there is proposed a vibration device which is capable of increasing a vibrating amount by increasing a size of a weight with the use of a cubic elastic unit combined to upper and lower surfaces of the weight instead of a conventional elastic unit combined to a side of the weight.

In still another aspect of the invention, there is also proposed a vibration device with a sound function, which may increase a vibrating amount by elastically supporting a larger magnetic force generating unit with the use of a cubic elastic unit.

According to the present invention, a vibration device that can generate more vibrating amount with the same size in comparison to the conventional vibration device may be obtained. Thus, it is possible to obtain a smaller vibration device than a conventional one with the same vibrating amount, or a vibration device with a larger vibrating amount than a conventional one with the same size.

Thus, if the vibration device according to the present invention is used as a signal reception sensing device for a mobile communication terminal, it may contribute to miniaturization of the mobile terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a sectional view showing a conventional vibration device;

FIG. 2 is a perspective view showing a leaf spring used in the conventional vibration device;

BEST MODE FOR CARRYING OUT THE INVENTION

Hereinafter, preferred embodiments of the present invention will be described in detail with reference to the accompanying drawings. However, the spirit of the invention is not limited to the proposed embodiments, but other embodiments may be easily proposed according to the spirit of the present invention by means of addition, modification or deletion of any component.

First Embodiment

Hereinafter, a vibration device according to a first embodiment of the present invention will be described in detail.

Figure 3:
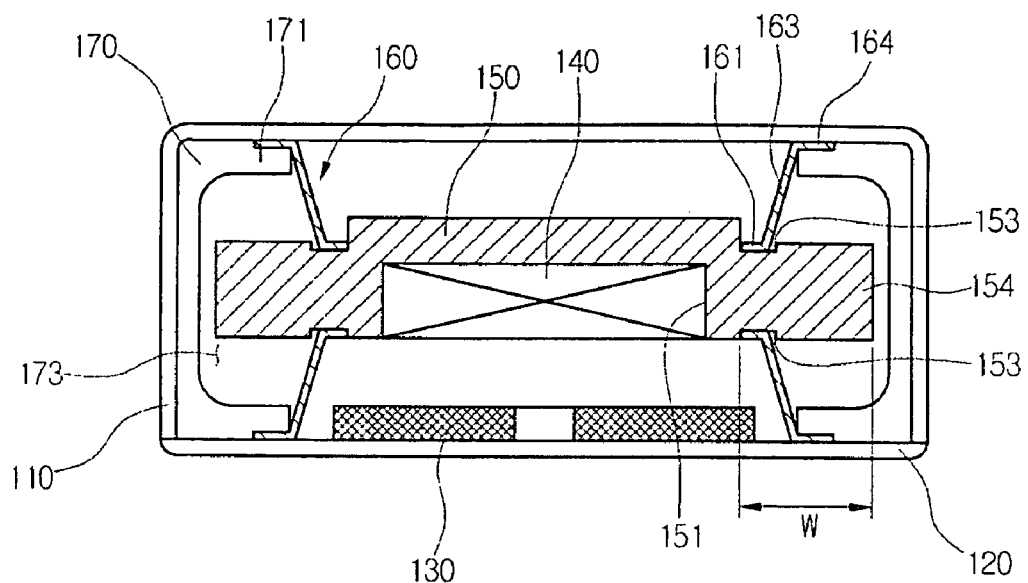
FIG. 3 is a sectional view showing a vibration device according to a first embodiment of the present invention.
Figure 4:
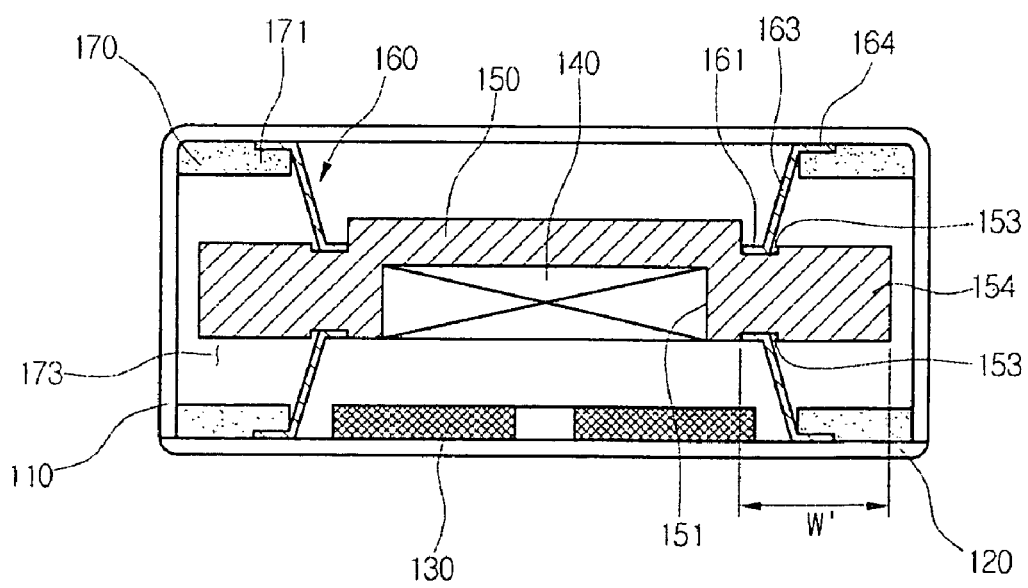
FIG. 4 is a sectional view showing another example of the vibration device according to the first embodiment of the present invention.
Figure 5:
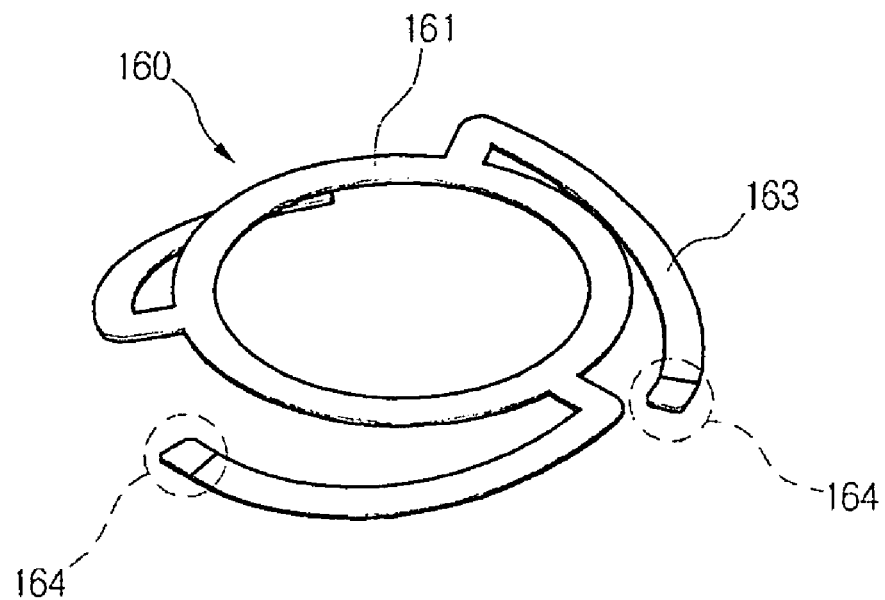
FIG. 5 is a perspective view showing an example of an elastic unit according to the present invention.
Figure 6:
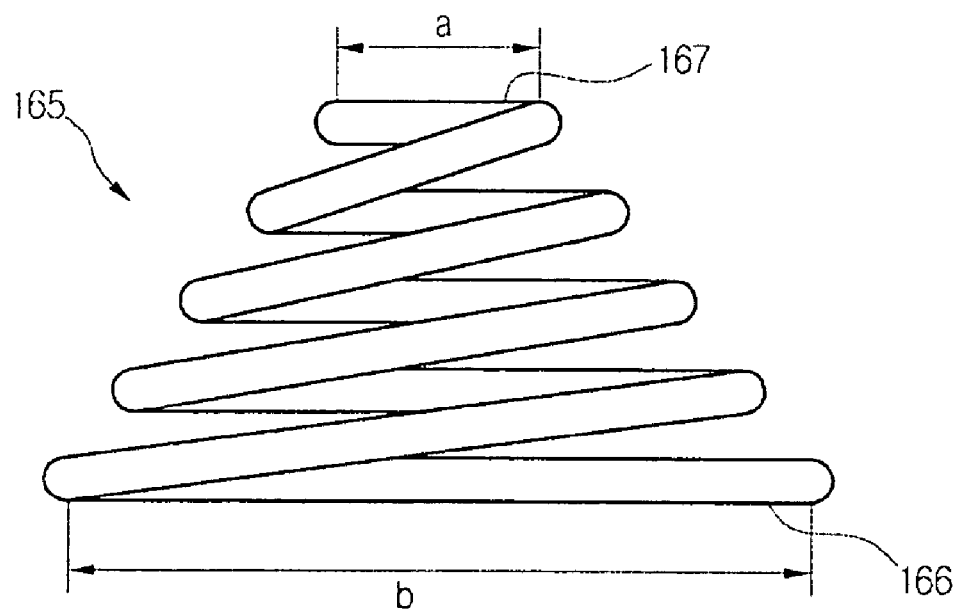
FIG. 6 is a side view showing another example of the elastic unit according to the present invention.

FIG. 3 is a sectional view showing a vibration device according to the first embodiment of the present invention, FIG. 4 is a sectional view showing another example of the vibration device according to the first embodiment of the present invention, FIG. 5 is a perspective view showing an example of an elastic unit used in the vibration device according to the present invention, and FIG. 6 is a side view showing another example of the elastic unit used in the vibration device according to the present invention.

As shown in FIG. 3, the vibration device according to the first embodiment of the present invention includes upper and lower cases 110 and 120 combined with each other, a magnetic force generating unit 130 formed at the center of the upper surface of the lower case 120, a vibrating unit including a magnet 140 and a weight 150, the magnet 140 for giving attractive or repulsive force by means of interaction with the magnetic flux generated by the magnetic force generating unit 130, the weight 150 making one body with the magnet 140 mounted thereto and increasing a vibrating amount with moving vertically by means of interaction between the magnetic force generating unit 130 and the magnet 140, elastic units 160 combined to the upper and lower surfaces of the weight 150 and extended below and above the weight 150 to elastically support the vibrating unit, and a fixing member 170 for fixing ends 164 of the elastic units 160.

Here, the magnetic force generating unit 130 may employ a winding coil, and the weight 150 is preferably made of tungsten.

Specifically, a magnet mounting groove 151 of a predetermined depth is formed at the center of the lower surface of the weight 150, and the magnet 140 is inserted and fixed in the magnet mounting groove 151 to make one body with the weight 150.

The elastic unit 160 is inserted and fixed in elastic unit insert grooves 153 formed on upper and lower surfaces of the weight 150 so as to elastically support the weight 150.

The elastic unit 160 includes a strip 161 inserted and fixed to the elastic unit insert grooves 153 of the weight 150 and having a closed-curve shape, and a plurality of support legs 163 extended from the strip 161, as shown in FIG. 5. The support legs 163 form a turning curve which descends in an axial direction of the strip 161, and an end 164 of each support leg 163 is fixed into a fixing groove 171 formed in the fixing member 170.

Here, the number of the support legs 163 is determined in consideration of a gravity center of the weight 150 elastically supported by the elastic units 160, and preferably at least two support legs are formed.

Meanwhile, the elastic unit 160 may be a conical coil spring 165 as shown in FIG. 6 or a coil spring with a polygonal corn shape. The lower or upper surface 166 or 167 of the conical coil spring 165 may have various shapes such as a circle, a tetragon, or a pentagon.

Here, in case of using the conical coil spring 165 of FIG. 6 instead of the elastic unit 160 shown in FIG. 5, the elastic unit insert groove 153 should be formed conforming to the shape of the upper surface 167 of the conical coil spring 165. In addition, a diameter (a) of the upper surface 167 which supports the weight 150 should be larger than a diameter of the magnet 140, and a diameter (b) of the lower surface 166 which contacts with the upper and lower cases should be determined to include at least the coil 130.

In addition, the fixing member 170 includes protrusions at the upper and lower ends which are contacted with the upper case 110 and the lower chase 120, and a recess 173 depressed a predetermined depth at the center. The fixing grooves 171 for fixing the end 164 of the elastic unit 160 are formed at the ends of the upper and lower protrusions of the fixing member 170.

Here, the fixing member 170 includes the fixing groove 171 for fixing the end 164 of the elastic unit 160 as shown in FIG. 4, and it may be separately formed only at a position where the elastic unit 160 is fixed.

In the vibration device configured as above according to the present invention, the size of the weight 150 may be enlarged in a circumferential direction since the weight 150 is elastically supported by the cubic-elastic units 160 and 165, which are combined on the upper and lower surfaces of the weight 150, extended above and below the weight 150 and fixed in the fixing groove 171 of the fixing member 170, instead of a conventional leaf spring which is combined to a side of the weight.

That is to say, the vibration device according to the present invention may further form a weight extension 154, which is an extension of the weight 150 in a circumferential direction as much as a predetermined length (W) from the elastic unit insert groove 153, not to be contacted to an inner side of the recess 173.

Here, the recess 173 of the fixing member 170 should have a vertical space so as not to be contacted with the weight extension 154 as the weight extension 154 extended in a length of W is vertically vibrated.

Meanwhile, though FIGS. 3 and 4 show that the magnetic force generating unit 130 is formed on the lower case 120 and the magnet 140 is formed to be faced with the magnetic force generating unit 130, the present invention is not limited to that case, but it is also possible that the magnetic force generating unit 130 is formed on the upper case 110 and the magnet 140 is correspondingly formed.

Hereinafter, operation of the vibration device configured as above according to the first embodiment of the present invention is described.

At first, if intermittent current is applied to the magnetic force generating unit 130 several ten or several hundred times per second, a magnetic field changing according to the intermittent current is formed in the magnetic force generating unit 130, so attractive force and repulsive force are repeatedly acted between the magnetic force generating unit 130 and the magnet 140.

As the attractive and repulsive forces are repeatedly formed several ten or several hundred times per second, the weight 150, which forms one body together with the magnet 140, is canted vertically without interruption, and an vibrating force generated by canting at this time is transferred to outside.

As mentioned above, by using the vibration device according to the first embodiment of the present invention, since the cubic elastic units are installed on the upper and lower surfaces of the weight 150 instead of a conventional plane elastic unit mounted in a circumferential direction of the weight 150, there is made a room in a circumferential direction of the weight 150, so the size of the weight 150 may be enlarged in the circumferential direction. Thus, it is possible to increase a vibrating amount by increasing weight of the weight 150 without reducing a size of the magnet 140.

In fact, the vibration device according to the first embodiment of the present invention gives an improved vibrating amount about 1.5 times in comparison to a conventional vibration device with the same size.

Second Embodiment

Figure 7:
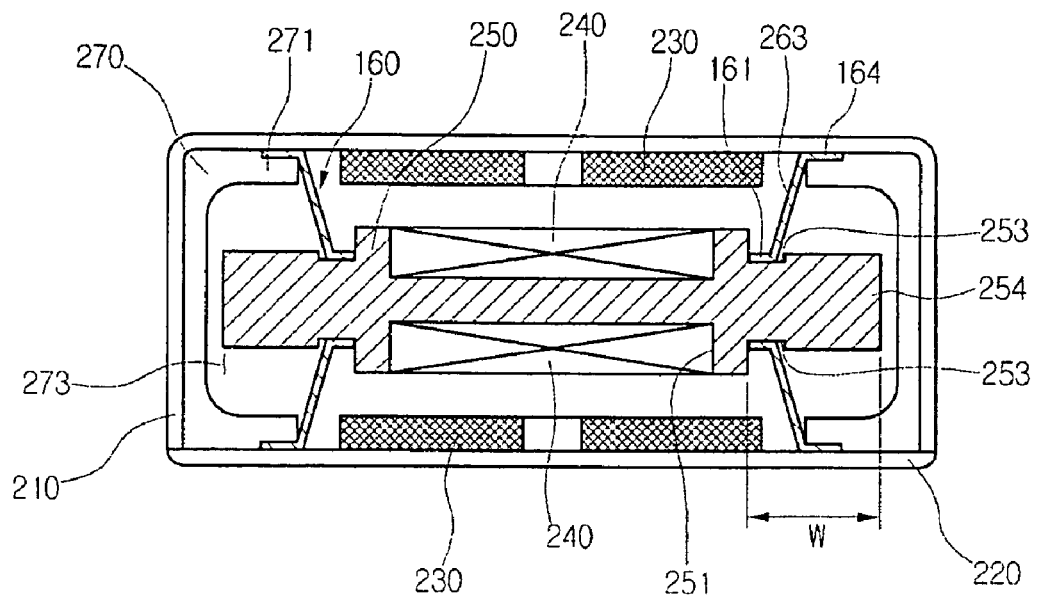
FIG. 7 is a sectional view showing a vibration device according to a second embodiment of the present invention.

FIG. 7 is a sectional view showing a vibration device according to a second embodiment of the present invention.

As shown in FIG. 7, the vibration device according to the second embodiment of the present invention includes upper and lower cases 210 and 220 combined with each other, magnetic force generating units 230 formed at the center of the upper and lower cases 210 and 220, two magnets 240 oppositely formed on each magnetic force generating unit 230 to give attractive or repulsive force by means of interaction with a magnetic flux generated by the magnetic force generating unit 230, a weight 250 to which the magnets 240 are mounted to make one body and which increases a vibrating amount with moving vertically by means of interaction between the magnetic force generating unit 230 and the magnet 240, elastic units 260 combined to upper and lower surfaces of the weight 250 and extended above and below the weight 250 to elastically support the weight 250, and a fixing member 270 for fixing ends of the elastic units 260.

The vibration device according to the second embodiment of the present invention is substantially similar to that of the first embodiment, except that the magnetic force generating units 230 are formed on each of the upper and lower cases 210 and 220, and the magnets 240 are respectively formed on the upper and lower surfaces of the weight 250 to be opposite to the magnetic force generating unit 230.

Except such differences, other configuration and operation are similar to those of the first embodiment.

Figure 8:
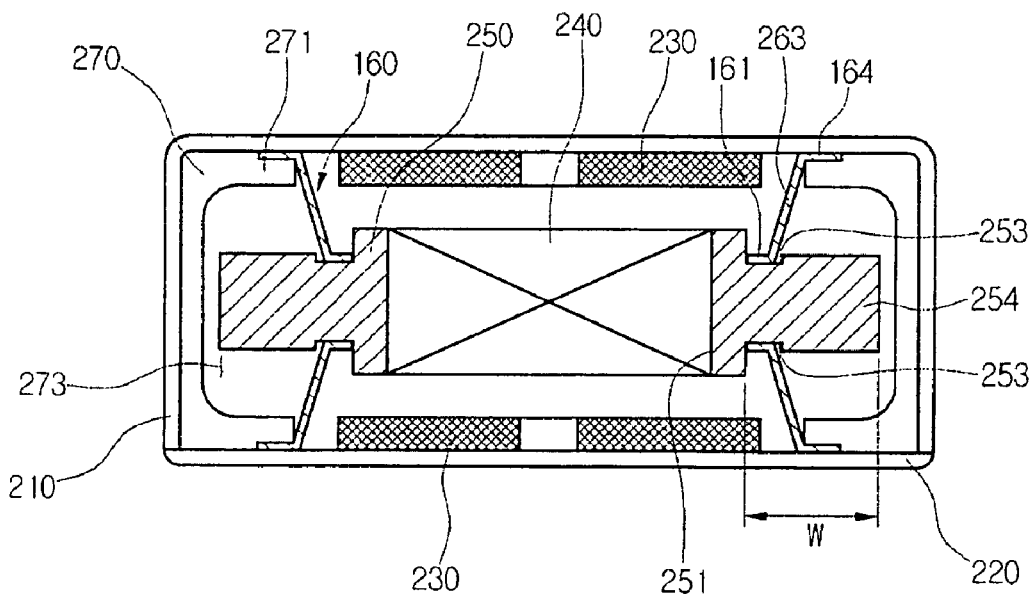
FIG. 8 is a sectional view showing another example of the vibration device according to the second embodiment of the present invention.

In addition, the magnet 240 formed on the weight 250 may be formed to vertically pass through the weight 250, as shown in FIG. 8.

When using the vibration device according to the second embodiment of the present invention, since the elastic units 250 are formed on the upper and lower surfaces of the weight 250 instead of being formed in a circumferential direction of both sides of the weight 250, a size of the weight may be extended as much as a distance (W) from an elastic unit insert groove 253 to a position just before an inner side of a recess 273 of the fixing member 270.

That is to say, the vibration device of this embodiment may increase a vibrating amount since an additional weight extension 254 is further formed in comparison to the conventional weight.

In addition, by forming the magnetic force generating unit 230 such as a winding coil to each of the upper and lower cases 210 and 220, it is possible to generate stronger attractive and repulsive force between the magnet 240 and the magnetic force generating unit 230.

Thus, the vibration device according to the second embodiment of the present invention may give an increased vibrating amount rather than a conventional one.

Third Embodiment

Figure 9:
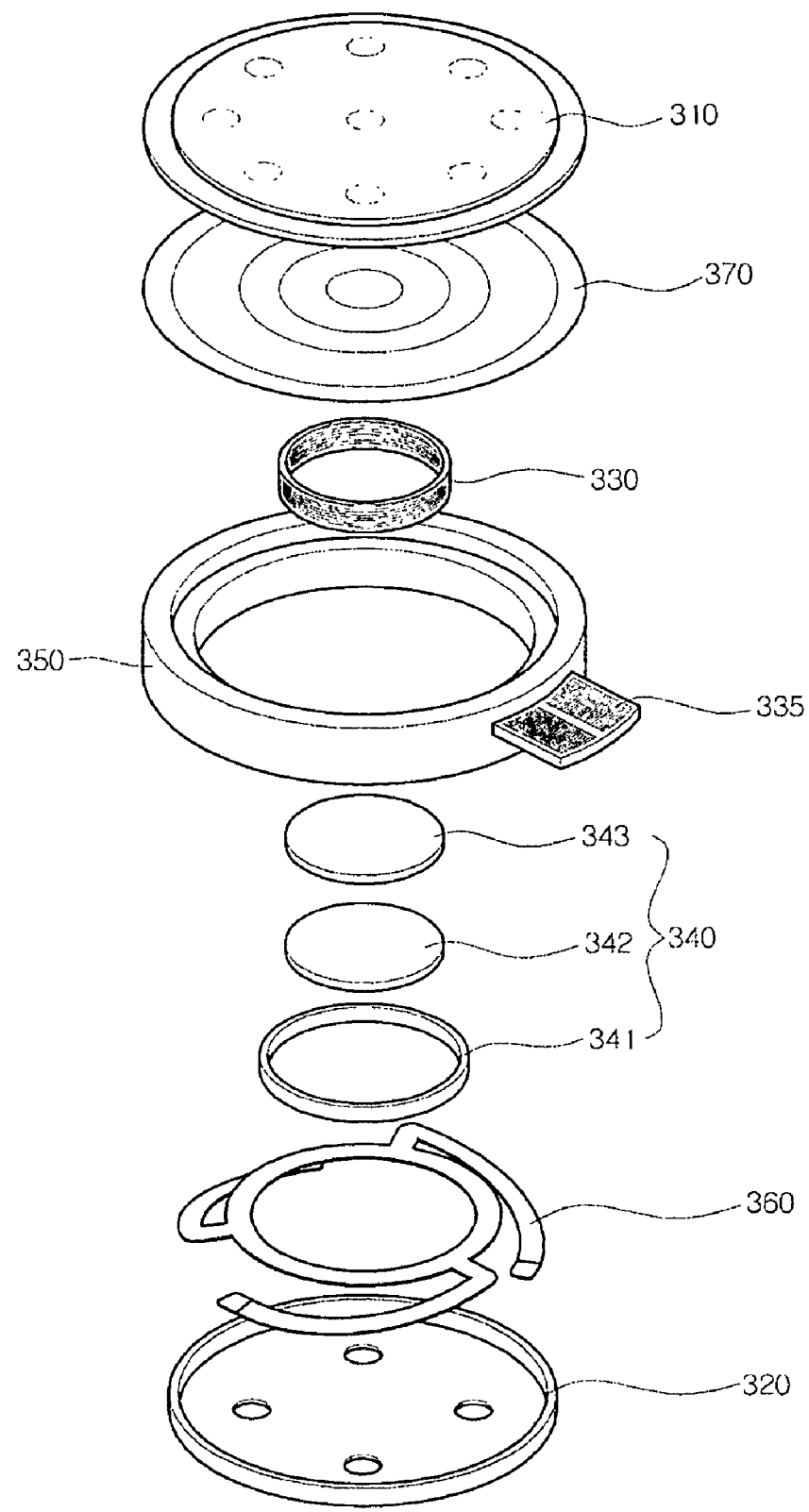
FIG. 9 is an exploded perspective view showing a vibration device with a sound function according to a third embodiment of the present invention.
Figure 10:
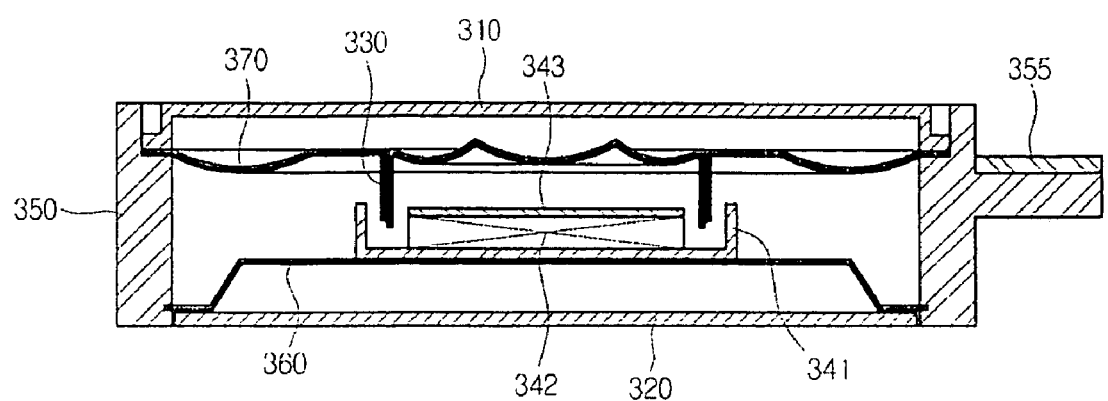
FIG. 10 is a sectional view showing the vibration device with a sound function according to the third embodiment of the present invention.

FIG. 9 is an exploded perspective view showing a vibration device with a sound function according to a third embodiment of the present invention, and FIG. 10 is a sectional view showing the vibration device with a sound function according to the third embodiment of the present invention.

The vibration device according to the third embodiment of the present invention has a sound function for generating a sound in addition to a basic vibrating function.

As shown in FIGS. 9 and 10, the vibration device according to the third embodiment of the present invention includes a case 350, a terminal plate 355 formed on one side of the case 350 to apply an external power thereto, a vibrating plate 370 for generating a sound above the case 350, a voice coil 330 for generating an electric field below the vibrating plate 370, a magnetic force generator 340 mounted below the voice coil 330, a cubic elastic unit 360 for elastically supporting the magnetic force generator 340, and upper and lower covers 310 and 320 mounted at upper and lower sides of the case 350 to protect the above components.

The voice coil 330 receives a power from the terminal plate 355 and generates an electric field. In addition, the magnetic force generator 340 includes a magnet 342 installed below the voice coil 330, a yoke 341 formed to surround the magnet 342, and a plate 343 seated upon the yoke 341, and generates a magnetic flux.

The elastic unit 360 may employ a cubic spring or a conical spring as shown in FIGS. 5 and 6.

In the vibration device configured as above, if current flows along the voice coil 330, an elastic field is generated, and the magnetic force generator 340 generates a magnetic field. By means of interaction between the electric field and the magnetic field, the vibrating plate 370 and the magnetic force generator 340, integrally combined to the voice coil 330, are vertically operated. At this time, the vertically operated vibrating plate 370 generates a sound, and the vertical movement of the magnetic force generator 340 is transferred to the elastic unit 360 which elastically supports the magnetic force generator 340, thereby transferring the vibration to outside.

The vibration device configured as mentioned above according to the third embodiment of the present invention may increase an outer diameter of the magnetic force generator 340 seated on the elastic unit 360, thereby being capable of generating larger magnetic force, in comparison to a conventional vibration device having a sound function using a leaf spring. Thus, the vibration device according to the third embodiment of the present invention may give a larger vibrating amount than a conventional one.

Industrial Applicability

As described above, the present invention may provide a vibration device with a larger vibrating amount since it may increase a size of the weight which generates vibration. In particular, since the vibration device of the present invention is capable of generating a larger vibrating amount in comparison to a conventional vibration device with the same size, it is possible to reduce a size of the vibration device with keeping a vibrating amount. Thus, when the vibration device of the present invention is used as a signal reception sensing device of a mobile communication terminal, it is possible to reduce a volume occupied by the vibration device with obtaining a desired vibrating amount, so the mobile communication terminal may be miniaturized.

What is claimed is:

1. A vibration device comprising:
upper and lower cases combined with each other to form a case, the upper case including an upper surface and a side surface extending from the upper surface to the lower case;
a magnetic force generating unit provided on the lower case;
a vibrating unit including a magnet facing the magnetic force generating unit, and a weight; and
at least one elastic unit supporting the vibrating unit elastically, the at least one elastic unit having a first portion directly contacting the upper case, a second portion contacting the vibrating unit, and a third portion between the first portion and the second portion, wherein the third portion has a slant,
wherein the first portion and the weight have an overlapping area in a vertical plane, and
wherein the first portion is arranged on a first circumference and the second portion is arranged on a second circumference, and wherein a diameter of the first circumference is larger than a diameter of the second circumference.

2. The vibration device according to claim 1, wherein the magnetic force generating unit and the vibrating unit are arranged in a vertical direction.

3. The vibration device according to claim 1, wherein the second portion and the magnetic force generating unit have an overlapping area in a vertical plane.

4. The vibration device according to claim 1, wherein the at least one elastic unit includes a strip of a closed-curve shape and a plurality of support legs extended from the strip.

5. The vibration device according to claim 1, wherein the magnet and the weight have an overlapping area in a horizontal plane and wherein the vibrating unit and the magnetic force generating unit have an overlapping area in a vertical plane.

6. A vibration device comprising:
upper and lower cases combined with each other to form a case;
a magnetic force generating unit provided on at least one surface of the upper and lower cases;
a vibrating unit including at least one magnet facing the magnetic force generating unit, and a weight; and
at least one elastic unit supporting the vibrating unit elastically, the elastic unit having a first portion directly contacting the upper case, a second portion contacting the vibrating unit, and a third portion between the first portion and the second portion, wherein the third portion has a slant,
wherein the first portion and the weight have an overlapping area in a vertical plane, and
wherein a maximum diameter of the magnetic force generating unit is larger than a maximum diameter of the magnet and smaller than a maximum diameter of the weight.

7. The vibration device according to claim 6, wherein the magnetic force generating unit and the vibrating unit are arranged in a vertical direction.

8. The vibration device according to claim 6, wherein the second portion and the magnetic force generating unit have an overlapping area in a vertical plane.

9. The vibration device according to claim 6, wherein the at least one elastic unit includes a strip of a closed-curve shape and a plurality of support legs extended from the strip.

10. The vibration device according to claim 6, wherein the magnet and the weight have an overlapping area in a horizontal plane and wherein the vibrating unit and the magnetic force generating unit have an overlapping area in a vertical plane.

* * * * *

UNITED STATES PATENT AND TRADEMARK OFFICE
CERTIFICATE OF CORRECTION

| | | |
|---|---|---|
| PATENT NO. | : 8,339,224 B2 | Page 1 of 1 |
| APPLICATION NO. | : 12/407708 | |
| DATED | : December 25, 2012 | |
| INVENTOR(S) | : Sang-Jin Kim | |

It is certified that error appears in the above-identified patent and that said Letters Patent is hereby corrected as shown below:

ON THE TITLE PAGE:

At item (63), correct the Related U.S. Application Data to read as follows:

--Continuation of application No. 10/527,755, filed as application No. PCT/KR2004/001615 on July 1, 2004, now Pat. No. 7,525,403.--

Signed and Sealed this
Fourteenth Day of May, 2013

Teresa Stanek Rea
*Acting Director of the United States Patent and Trademark Office*